G. AMBORN.
TOOL HOLDER.
APPLICATION FILED JULY 17, 1913.

1,090,810.

Patented Mar. 17, 1914.

2 SHEETS—SHEET 1.

WITNESSES:
René Buine
J. J. Wallace

INVENTOR:
George Amborn
By Attorneys,
Fraser Turk & Myers

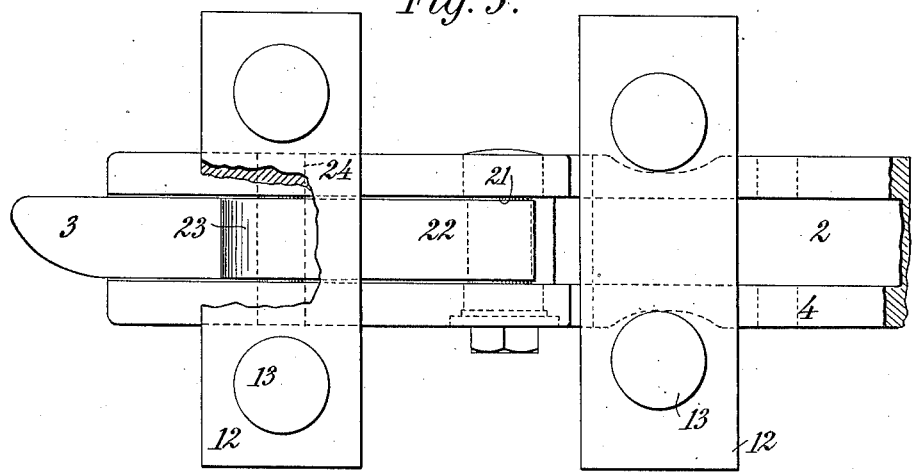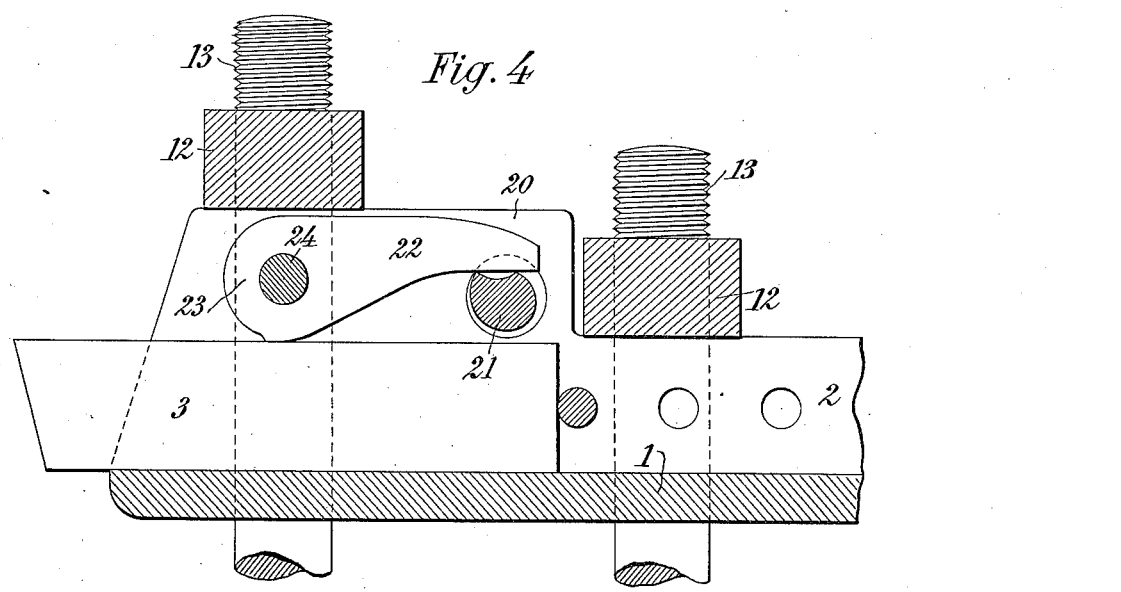

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

TOOL-HOLDER.

1,090,810.  Specification of Letters Patent.   Patented Mar. 17, 1914.

Application filed July 17, 1913.  Serial No. 779,602.

*To all whom it may concern:*

Be it known that I, GEORGE AMBORN, a citizen of the United States, residing at Chapinville, in the county of Litchfield and State of Connecticut, have invented certain new and useful Improvements in Tool-Holders, of which the following is a specification.

This invention relates to tool holders, and more especially to tool holders for heavy work, and aims to provide improvements therein.

The invention provides a strong, durable and simply constructed holder, which can be operated to rapidly clamp in place and unclamp tools therein, which will securely hold the tool when clamped in the holder, and which has no unnecessary projecting parts to get in the way of other parts of the mechanism or work, or which would prove dangerous to a workman.

Other features of improvement will hereinafter appear.

Several embodiments of the invention are illustrated in the accompanying drawings.

Figure 1:
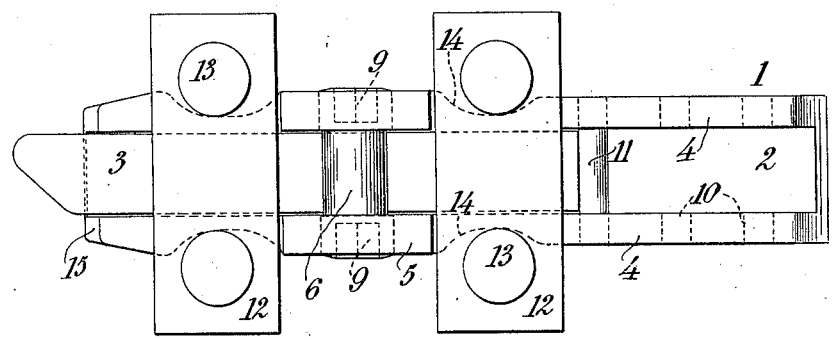
Figure 2:
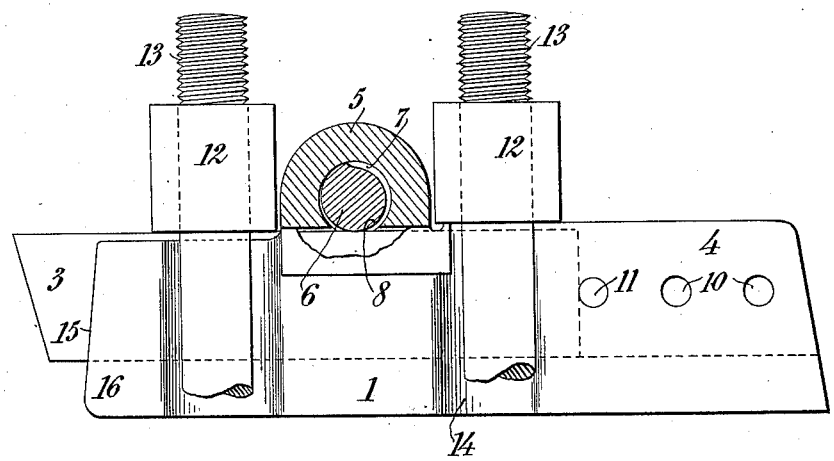

Figure 1 is a top plan view of a tool holder embodying the invention; Fig. 2 is a side elevation of the construction shown in Fig. 1; Fig. 3 is a top plan view of a modification; and Fig. 4 is a side elevation of the construction shown in Fig. 3.

In said drawings, 1 designates the body of a tool holder having a recess or channel 2 in its upper side adapted to receive the shank of a cutting-tool 3. The recess or channel is preferably open at its top and end to end to facilitate manufacture. The side-pieces 4 of the body are preferably prolonged at a point toward the front end of the tool holder to form ears 5.

6 is a cam piece having rounded ends 7 having bearing in the ears 5 and having a cam portion 8 adapted to bear upon the upper side of the cutting tool when the cam piece is turned to clamping position. The cam piece is turned by means of a wrench and for this purpose is preferably provided with a squared or hexagonal socket 9 for receiving the correspondingly shaped end of the wrench. All projecting parts on the tool holder, which are liable to injure the hands of a workman or to be damaged by rough treatment of the tool holder, are avoided by this construction.

The sides of the tool holder body are preferably provided with a series of holes 10 adapted to receive a pin or rod 11, which engages the rear end of a cutting tool and provides a back stop therefor.

The tool holder may be held in place on the turret or other part which carries the same by means of cleats 12 which are pressed down on the tool holder by means of nuts screwing on bolts 13 passing through the cleats. The side pieces 4 may be cut down at the front end of the tool holder to enable the front cleat 12 to bear directly on the cutting tool when in place in the holder and assist the cam piece 6 in maintaining it in place. The exterior sides of the tool holder may also be provided opposite the bolts 13 with bays or recesses 14 adapted to partially receive the bolts and prevent longitudinal movement of the tool holder.

The front end 15 of the tool holder may be given a slight backward cant, whereby the lower part of the tool holder constitutes a projecting under-support 16 for the cutting tool.

In the modified form shown in Figs. 3 and 4 the side pieces 4 are prolonged upwardly at the front end of the holder to constitute cheek-pieces 20, between which is mounted a cam piece 21. The cam piece 21 instead of bearing directly on the upper side of the cutting tool, bears against the under side of an arm 22 forming part of a cam piece 23, pivoted upon a pin 24 passing through the cheek pieces, and adapted to bear upon the upper side of the tool 3. The tool is clamped in place by turning the cam piece 21, which in turn acts upon the cam piece 23 through the arm 22, and causes it to press with great force against the upper side of the tool and hold it securely in place.

What is claimed is:—

1. A tool holder comprising a body having a tool-receiving channel therein, and a cam extending across said channel and adapted to bear upon the upper side of a tool within said tool holder.

2. A tool holder comprising a body having a tool-receiving channel therein open at its top and extending from end to end of the tool holder, and a cam extending across said channel and adapted to bear upon the upper side of a tool within said tool holder.

3. A tool holder having bays on its sides adapted to partially receive bolts of a clamp and prevent longitudinal movement of the tool holder.

4. A tool holder comprising a body having a tool-receiving channel therein, a bottom wall, and side walls on two sides, said channel being open at its upper side to permit a cleat of a clamping device extending transversely across said tool body to press upon a tool in said channel.

5. A tool holder comprising a body having a tool-receiving channel therein, a bottom wall, and side walls on two sides, means for clamping a tool in position in said holder, said channel being open at its upper side to permit a cleat of a clamping device extending transversely across said tool body to press upon a tool in position in said holder.

6. A tool holder comprising a body having a tool-receiving channel therein, a cam-piece adapted to bear upon a tool in said channel, said cam having a lever-arm, and a second cam-piece adapted to engage said lever-arm to turn said first-mentioned cam-piece.

7. A tool holder comprising a body having a tool-receiving channel therein, cheek pieces at the sides of said channel, a cam-piece pivoted in said cheek pieces adapted to bear upon a tool in said channel, said cam having a lever-arm, and a second cam-piece adapted to engage said lever-arm to turn said first-mentioned cam-piece.

In witness whereof, I have hereunto signed my name in the presence of two subscribing witnesses.

GEORGE AMBORN.

Witnesses:
WILLIAM G. COLE,
CHARLES E. AHRENSFIELD.

---

Copies of this patent may be obtained for five cents each, by addressing the "Commissioner of Patents, Washington, D. C."